United States Patent [19]

Mohajer et al.

[11] Patent Number: 4,839,124

[45] Date of Patent: Jun. 13, 1989

[54] REDUCTION OF CARBOXYL END GROUPS IN POLYESTER FIBERS WITH LACTIM ETHERS

[75] Inventors: Yousef Mohajer, Midlothian; Stanley D. Lazarus, Petersburg, both of Va.; Robert S. Cooke, Morris Plains, N.J.

[73] Assignee: Allied-Signal Inc., Morris Township, Morris County, N.J.

[21] Appl. No.: 161,553

[22] Filed: Feb. 29, 1988

[51] Int. Cl.$^4$ ............................ D01F 6/62; D01F 1/10
[52] U.S. Cl. ............................ 264/211; 264/176.1; 264/211.12
[58] Field of Search ............... 264/211, 210.6, 210.8, 264/211.14, 211.12, 176.1

[56] References Cited

U.S. PATENT DOCUMENTS

| | | | |
|---|---|---|---|
| 2,465,319 | 3/1949 | Whinfield et al. | 264/210.8 |
| 3,051,212 | 8/1962 | Daniels | 264/210.8 |
| 4,016,142 | 4/1927 | Alexander et al. | 525/437 |
| 4,080,360 | 3/1978 | Schlichting et al. | 524/98 |
| 4,442,058 | 4/1984 | Griffith et al. | 264/141 |
| 4,543,396 | 9/1985 | Arai et al. | 525/440 |

Primary Examiner—Hubert Lorin
Attorney, Agent, or Firm—William H. Thrower

[57] ABSTRACT

An improved process for controlling and reducing the concentration of free carboxyl end groups in condensation polyester melt spun fiber is provided. By selection of a multifunctional compound, it is possible to increase the intrinsic viscosity of the fiber. The process comprises admixing and reacting with molten polyester polymer an effective amount of a lactim compound of the formula

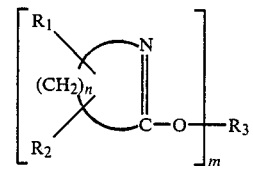

wherein
n is an integer of 2 to 15;
m is an integer of 1 to 4;
$R_1$ and $R_2$ are independently hydrogen, halogen, nitro, amine, $C_1$–$C_{10}$ alkyl, $C_5$–$C_{12}$ cycloalkyl, $C_7$–$C_9$ alkyl aromatic, or $C_6$–$C_{10}$ aromatic; and
$R_3$ is a mono- to tetravalent organic radical selected from the group consisting of $C_1$–$C_{32}$ alkyl, $C_5$–$C_{14}$ cycloalkyl, $C_7$–$C_{16}$ alkyl aromatic, and $C_6$–$C_{14}$ aromatic.

The lactim reacted polymer is then melt spun to form a fiber.

19 Claims, No Drawings

REDUCTION OF CARBOXYL END GROUPS IN POLYESTER FIBERS WITH LACTIM ETHERS

BACKGROUND OF THE INVENTION

1. Field of the Invention

This invention relates to the preparation of synthetic polyester filaments, yarns, and cords useful as industrial fibers which show improved strength retention when exposed to hydrolytic conditions or when sealed in a rubber and exposed to elevated temperatures. More particularly, the invention relates to a process whereby the free carboxyl end group concentration of synthetic polyesters may be reduced to a low level while producing yarns having good tensile properties.

2. Description of Relates Art

Terephthalate polyesters such as those disclosed by U.S. Pat. No. 2,465,319 are produced in significant quantities for a variety of commercial products. Polyethylene terephthalate, one of the better known terephthalate polyesters, is a reaction product of terephthalic acid and ethylene glycol and is produced having a high degree of polymerization forming long linear polymer chains which normally terminate with either a carboxyl and group or a hydroxyl end group. The melt-spinning of high molecular weight polyethylene terephthalate has been successfully employed to produce fibers possessing properties suitable for use in reinforcing rubber articles including pneumatic tires.

In U.S. Pat. No. 3,051,212 to Daniels, it is disclosed that when ruber articles such as tires, belting, and the like are reinforced with fibers or cords comprising synthetic linear polyester, these fibers or cords show superior strength retention during exposure to high operating temperatures when the free carboxyl end group concentration of the polyester which comprises the cords is reduced to less than 15 milliequivalents per kilogram (meq/kg). It has also been observed that there appears to be a correlation between the resistance of linear polyesters of a given carboxyl end group concentration to high running temperatures in rubber and their resistance to hydrolytic conditions which may be encountered within hot rubber structures.

When structures having polyester reinforcing filaments with high carboxyl group concentration are exposed to high operating temperatures under hydrolytic conditions, excessive loss of strength is observed. This strength loss is particularly evident with polyester filaments used as reinforcing cords or fabrics in pneumatic tires which normally are expected to operate in a safe manner at high temperatures caused by high speeds and heavy loads.

Thus, low free carboxyl end group concentrations for polyester are highly desirable because it is believed to reduce degradation of the fiber. U.S. Pat. No. 4,016,142 to Alexander et al, discloses reducing the free carboxyl end groups by modifying the polyester with small amounts of a glycidyl ether which react with the carboxyl end groups present to form free hydroxy end groups. U.S. Pat. No. 4,442,058 to Griffith et al. discloses a method of reducing the number of free carboxyl end groups whereby minor amounts of a low-boiling oxirane compound such as ethylene oxide are added. U.S. Pat. No. 4,543,396 to Arai et al. discloses reaction of a bisoxazoline compound with the free carboxyl end groups.

It is the object of this invention to provide an improved process for controlling and reducing the concentration of free carboxyl end groups in synthetic linear polyesters. A further object of this invention is to provide a process whereby a modified synthetic condensation polyester polymer of increased molecular weight may be obtained. Yet a further object of this invention is to provide a technique for producing high strength fibers, and provide for drawn yarn having high tensile properties.

As used herein synthetic polyesters mean filmforming or fiber-forming condensation products of dicarboxylic acids such as terephthalic acid and glycols of the series $HO(CH_2)_nOH$ where n is an integer from 2 to 10. An important example of this class of polyesters is polyethylene terephthalate which may be prepared by a number of well known processes. For use as reinforcing elements in rubber structures, melt-spun filaments of polyethylene terephthalate are drawn to about 3.5 to about 7.0 times their length after melt spinning, twisted into yarns and plied into cords or woven into fabrics. The cords or fabrics are then treated with adhesive and bonded against or into the rubber structures.

Synthetic linear polyester yarns or cords made by known means can be shown to contain a free carboxyl end group concentration of about 20 or more milliequivalents per kilogram (meq/kg). By "free carboxyl end groups" are meant the acid group,

The concentration of which may be determined by Pohl's Method as described in Analytical Chemistry, Vol. 26, page 1614, October, 1954. The formation of such free carboxyl end groups, referred to hereinafter as "COOH", results as a natural consequence of the processes normally employed in the production of linear polyester polymers.

Known synthetic linear polyester yarns or cords for use as rubber structure reinforcing elements are preferably made from a polymer having an intrinsic viscosity of from 0.75 to 1.0 g/dl or higher. Whereas synthetic linear polyester filaments used in textile products normally have an intrinsic viscosity of the polymer of from 0.35 to 0.66 g/dl, these filaments are less suitable as rubber reinforcing elements since they are comparatively weak at a given extension level and fatigue to rupture with relatively little flexing. Filaments made from higher intrinsic viscosity synthetic linear polyester are stronger and less susceptible to such flexing fatigue. It has been found, however, that in the production of a polymer of a high intrinsic viscosity by the normal method of extending the polymerization period, an increase in free carboxyl group concentration results. Thus, while a high intrinsic viscosity polymer may be produced to overcome the problem of filament strength and flexing fatigue, at the same time the added carboxyl end group content results in an increase in the amount of strength lost when the filaments are exposed to high temperatures under hydrolytic conditions in rubber.

The carboxyl concentration is determined by dissolving the polyester in a 70/30 O-cresol/chloroform mixture and titrating the solution with 0.05N KOH in methanol. The end point is determined potentiometrically.

By the phrase "intrinsic viscosity", sometimes denominated IV, it is meant to describe the reduced viscosity of the polymer at zero concentration, which may be determined by measuring the flow times of a polymer solution after successive dilutions with fresh solvent, calculating the reduced viscosities, and extrapolating a plot of the reduced viscosities against concentration to zero concentration. The reduced viscosity is obtained from the expression:

$$\left[\frac{\text{Flow time of polymer solution}}{\text{Flow time of solvent}} - 1\right] \times \frac{1}{c}$$

where c is the concentration expressed as grams of polymer per 100 milliliter of solvent (g/dl). As used herein, the intrinsic viscosity was measured at 25° C., using a 60/40 mixture of phenol and tetrachloroethane as a solvent in a modified Ostwald viscometer.

SUMMARY OF THE INVENTION

This invention provides an improved process for controlling and reducing the concentration of free carboxyl end groups in linear condensation polyester melt spun fiber. In addition, by selection of a multifunctional compound within the invention, it is possible to increase the intrinsic viscosity of the fiber. The process comprises admixing and reacting with molten polyethylene terephthalate polymer an effective amount of a lactim compound of the formula

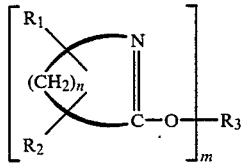

wherein n is an integer of 2 to 15;

m is an integer of 1 to 4;

$R_1$ and $R_2$ are independently hydrogen, halogen, nitro, amine, $C_1$-$C_{10}$ alkyl, $C_5$-$C_{12}$ cycloalkyl, $C_7$-$C_9$ alkyl aromatic, or $C_6$-$C_{10}$ aromatic; and $R_3$ is a mono- to tetravalent organic radical selected from the group consisting of $C_1$-$C_{32}$ alkyl, $C_5$-$C_{14}$ cycloalkyl, $C_7$-$C_{16}$ alkyl aromatic, and $C_6$-$C_{14}$ aromatic. The lactim reacted polymer is then melt spun to form a fiber.

DESCRIPTION OF THE PREFERRED EMBODIMENT

The process of the invention pertains to melt spinning high molecular weight polyester polymer to produce fibers with reduced carboxyl end group concentration. The molten polyester polymer is admixed and reacted with an effective amount of a lactim compound of the formula

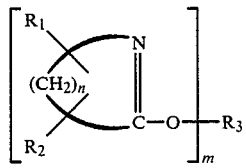

wherein n is an integer of 2 to 15;

m is an integer of 1 to 4;

$R_1$ and $R_2$ are independently hydrogen, halogen, nitro, amine, $C_{1-10}$ alkyl, $C_{5-12}$ cycloalkyl, $C_{7-9}$ alkyl aromatic, or $C_{6-10}$ aromatic; and $R_3$ is a mono- to tetravalent organic radical selected from the group consisting of $C_{1-32}$ alkyl, $C_{5-14}$ cycloalkyl, $C_{7-16}$ alkyl aromatic, and $C_{6-14}$ aromatic. The reacted molten polymer is forced under pressure to a spinneret and extruded into a zone of lower pressure and temperature to form a fiber.

Preferably, $R_3$ is selected from the group consisting of $C_{1-32}$ alkyl, $C_{5-14}$ cycloalkyl, and $C_{7-16}$ alkyl aromatic. Most preferably, $R_3$ is $C_{1-32}$ alkyl.

The lactim compounds used in this invention can be made according to the method disclosed in West German Offenlegungsschrift No. 1,912,739 published Oct. 1. 1970, Krimm et al. inventors.

As demonstrated below in the examples, the lactim compound reacts readily with molten polyethylene terephthalate polymer, with demonstrated advantages within as little as one minute reaction time. It would thus be advanatageous to the process to extrude the molten polymer into fiber within a resonable period after admixing with the lactim compound to minimize any thermal degradation that may result. The lactims are added in a sufficient amount to obtain desired results. A preferred range is 0.1 to 5.0 weight percent based on weight of the polymer, more preferably 0.1 to 2.0 weight percent, most preferably 0.1 to 1.0 weight percent.

The lactims are best described in reference to the general formula given above and by giving examples to materials used in their synthesis. Above, (n+1) denotes the size of the parent lactam used in the synthesis of the lactim. Suitable lactams include 4-butyrolactam (n+1=4), 5-valerolactam (n+1=5), 6-caprolactam (n+1=6), 8-capryllactam (n+1=8), and 12-laurolactam (n+1=12).

The reactivity of the lactim compound with molten PET polymer can be modified by substitution of hydrogens in the parent lactam by appropriate groups such as halogen, nitro, amine, alkoxy, or aromatics. Thus in the general formula provided above $R_1$ and $R_2$ are intended to represent substitution for the hydrogens in the ring methylene groups $(CH_2)_n$. Examples of such lactams are 3,3-dimethyl-3-propiolactam, α-chloro-caprolactam, α-nitro-caprolactam, α through ε-phenyl caprolactams. One may also use bislactams in the synthesis of the lactim compound. Examples include γ,γ'-bis-caprolactam and methylene-bis-caprolactam.

In the general formula above, R can be an aliphatic, cycloaliphatic, alkyl aromatic or an aromatic radical and is derived from the hydroxy compound used in the synthesis of the lactim. Monofunctional alcohols produce monolactims (m=1), bisfunctional alcohols result in bislactims (m=2), trifunctional alcohols give trislactims (m=3), and tetrafunctional alcohols producing tetrafunctional lactims. Use of heteroatoms in the structure of R is permitted. Examples of monofunctional alcohols include methanol, ethanol, propanol, isopropanol, butanol, decanol, stearyl alcohol, allyl alcohol, 2-chloroethanol, tribromoethanol, cyclohexanol, and benzyl alcohol. Examples of bisfunctional alcohols include ethylene glycol, propylene glycol, butylene glycol, neopentyl glycol, hexanediol, diethylene glycol, triethylene glycol, 2,2'-dihydroxydiethyl sulfide, and dihydroxycyclohexane. Examples of trifunctional alcohols include glycerin, O,O',O''-trishydroxyethyl pyrogallol, and triethanol amine. Examples of tetrafunctional alcohols include tetrahydroxyethyl ethylenediamine and tetrahydroxyethyl-p-phenylenediamine.

A selected alcohol is reacted with a selected lactam in a known manner such as that described in Offenlegungsschrift No. 1,912,739 to obtain the lactim compound utilized in this invention.

Some specific examples of lactim ether compounds useful in the invention include:

O-methylcaprolactim (R is —$CH_3$, m=1, n=5),
O-ethylcaprolactim (R is —$CH_2CH_3$, m=1, n=5),
O,O'-butylene bis-caprolactim (R is
—$CH_2$—$CH_2$—$CH_2$—$CH_2$—, m=2, n=5),
O,O'-triethylene glycol bis-caprolactim (R is
—$CH_2$—$CH_2$—O—$CH_2$—$CH_2$—O—$CH_2$—$CH_2$—, m=2, n=5), and
O,O'-diethylene glycol bis-caprolactim (R is
—$CH_2$—$CH_2$—O—$CH_2$—$CH_2$—, m=2, n=5).

In the practice of this invention the lactim compound is permitted to react with the molten PET polymer. The lactim compound can be added directly to molten polymer or, alternatively, can be mixed with polymer chips prior to melting.

The lactim compound reacts with a carboxyl end group of PET to form an ester linkage of R with the polymer chain, with a lactam formed as a reaction byproduct. The lactam reacts with water to form an alcohol and a lactam. Thus it is though that the reaction byproducts or products of hydrolysis for the lactim compound are innocuous materials such as lactams, alcohols, glycols, or the like. This provides important environmental advantages regarding safety and handling.

It will be appreciated that a monofunctional lactim compound (m=1) will serve to end cap a carboxyl end group, thus reducing such end group concentraton. However, by selecting a multifunctional lactim compound (m=2, 3 or 4), it becomes additionally possible to increase intrinsic viscosity by chain extension. By selection of trifunctional or tetrafunctional lactim compounds and by control of reaction conditions it becomes possible to promote chain extension or to promote branching of the linear PET polymer.

EXAMPLE 1

In this experiment monofunctional caprolactims are blended with molten polyester in a Brabender plastograph at a certain temperature. Samples are removed after a given reaction time and the changes in IV and free carboxyl end group concentration (COOH) are measured. The polyethylene terephthalate (PET) polymer used in this experiment had an original IV of 0.95 g/dl and carboxyl content of 18 meq/kg. It was dried by a standard procedure (6 hours at 120° C. and 18 hours at 160° C., all under vacuum) and was immediately stored under dry nitrogen until use. The plastograph was turned on and allowed to reach the desired temperature (280° C. in this case). Fifty (50) grams of dried PET chips were poured into the plastograph at 30 rpm as rapidly as possible and were allowed to melt for two minutes. A preweighed quantity of the additives (0.25 gram in this example) was put on the molten PET and was allowed to react with the polymer for a given time (2 minutes) after which the sample was removed rapidly and quenched in an ice water bath. The IV and carboxyl content of the samples were analyzed as described previously. For control PET, no additive was used, but after allowing the polymer to melt for 2 minutes, the polymer was allowed to remain in the plastograph for the same amount of time (2 minutes in this case) as the samples containing the additives before it was removed and quenched. The data is given below in Table 1.

Comparing the COOH results, it is apparent that the additives examined have been beneficial for reduction of the carboxyl as compared to the control which did not contain any additive. The O-methyl caprolactim results in carboxyl reduction of 2 meq/kg as compared to the control and O-ethyl caprolactim produces 12 meq/kg reduction under this given set of conditions. Thus caprolactim ethers are good carboxyl scavengers and moreover the reactivity of the scavenger appears to be dependent on the nature of the R group attached to lactim moieties. It is important to realize that under the experimental conditions the carboxyl content of the control polymer relative to that of the original chip may increase (Run 1 and 3) due to thermal degradation and hydrolysis. We will therefore focus our attention in the forthcoming examples to the relative change of carboxyl ($\Delta COOH = COOH_{control} - COOH_{sample}$) or change of IV ($\Delta IV = IV_{control} - IV_{sample}$) and not their absolute values.

Another important point to consider is the calculated percent efficiency which is based on observed ratio of molar changes of carboxyl content to the moles of additive used as defined below.

$$\% \text{ Efficiency} = \frac{\text{Decrease in No. equivalence COOH}}{\text{No. equivalence of additive used}} \times 100$$

Rearranging we obtain $$\% \text{ Efficiency} = \frac{-\Delta \text{COOH} \times MW_{additive}}{\% \text{ wt of additive} \times m \times 100}$$

where
$\Delta$COOH is defined as above and units are meq/kg;
$MW_{additive}$ is the molecular weight of the additive;
% wt of additive is weight of additive per 100 g polyester;
m is the functionality of lactim additive as defined previously and for example
m=1 for monofunctional
m=2 for bifunctional
m=3 for trifunctional
m=4 for tetrafunctional.

As seen in Table 1 the efficiencies are not 100 percent under this experimental condition and could therefore potentially be improved either by modification of the chemical structure of catalyst such as potassium iodide. As expected neither O-methyl or O-ethyl caprolactim result in increase of IV because both of the additives are monofunctional.

TABLE 1
Changes in Intrinsic Viscosity and Carboxyl Content for PET After Reaction with Additives in Brabender Plastograph

| Run | Additive | IV g/dl | COOH meq/kg | ΔIV g/dl | ΔCOOH meq/kg | % Efficiency |
|---|---|---|---|---|---|---|
| 1 | None, Control | 0.82 | 23 | — | — | — |
| 2 | O—Methyl Caprolactim | 0.80 | 21 | −0.02 | −2 | 5.1 |
| 3 | O—Ethyl | 0.79 | 11 | −0.03 | −12 | 33.9 |

TABLE 1-continued
Changes in Intrinsic Viscosity and Carboxyl Content for PET After Reaction with Additives in Brabender Plastograph

| Run | Additive | IV g/dl | COOH meq/kg | ΔIV g/dl | ΔCOOH meq/kg | % Efficiency |
|---|---|---|---|---|---|---|
| | Caprolactim | | | | | |

The original PET polymer had IV of 0.95 g/dl and carboxyl content of 18 meq/kg. The reaction temperature was 280° C. and reaction time was 2 minutes. The additive loading was 0.5 percent by weight in all cases except zero for the control.

EXAMPLE 2

This experiment describes the extent of reaction of a monofunctioinal caprolactim (O-ethyl caprolactim) as a function of reaction time. The experimental procedure is the same as those described in Example 1, except that instead of removing one sample at the predetermined time, samples were removed from the same reaction mixture at stated intervals. Thus the first sample was removed after 1 minute of reaction time, sample 2 after 2 minutes, sample 3 after 4 minutes and sample 4 after 6 minutes. All the samples were quenched immediately in ice/water bath and analyzed later. As described in Example 1 a control sample was run along with this experiment and the samples were removed after 1, 2, 4, and 6 minutes. The data is presented in Table 2. The reduction of carboxyl occurs gradually reaching the full value at about 4 minutes of reaction at 290° C. At 6 minutes, the carboxyl value has gone up slightly probably due to thermal degradation. As anticipated this monofunctional caprolactim does not help build up of the molecular weight and indeed as compared to the control it results in some reduction as reflected in the negative change of IV (-ΔIV).

TABLE 2
Reaction of PET with O—Ethyl Caprolactim at 290° C. in Brabender Rheometer as a Function of Time

| Additive | Reaction Time, min | ΔIV g/dl | ΔCOOH meq/kg | % Efficiency |
|---|---|---|---|---|
| O—Ethyl caprolactim | 1 | -0.026 | -4.5 | 12.7 |
| | 2 | -0.015 | -4.6 | 13.0 |
| | 4 | -0.032 | -8.6 | 24.3 |
| | 6 | -0.020 | -7.7 | 21.7 |

The Rheometer is operated at 30 rpm and the additive load is 0.5 percent by weight.

EXAMPLE 3

In this example we examine the extent of reaction of a bifunctional caprolactim (O,O'-butylene biscaprolactim) as a function of time at 290° C. in a Brabender Rheometer. The experimental details are the same described in Example 2. The data is summarized in Table 3. The rate and extent of carboxyl reduction appear to be higher with this bifunctional additive as compared to the monofunctional additive O-ethyl caprolactim. Within one minute the carboxyl was reduced by about 22 meq/kg and remained at a highly reduced level through the entire course of the reaction. Contrary to the monofunctional caprolactims, the bislactims, as expected, tie the carboxyl end of the polyester and result in increase in molecular weight of the polymer. This is reflected in the positive ΔIV. The build up of the molecular weight occurs more gradually (as compared to rapid reduction of COOH) over the 6-minute period and perhaps a higher +ΔIV would result with additional reaction time. Thus the bifunctional caprolactim not only reduces carboxyl content, but also builds up molecular weight and therefore should improve the strength of yarn produced from the polymer.

TABLE 3
Reaction of PET with O,O'—Butylene bis-Caprolactim at 290° C. in a Brabender Rheometer as a Function of Time

| Additive | Reaction Time, min | ΔIV g/dl | ΔCOOH meq/kg | % Carboxyl Scavenging Efficiency |
|---|---|---|---|---|
| O,O'—Butylene bis-Caprolactim | 1 | +0.041 | -21.6 | 60.6 |
| | 2 | +0.084 | -20.5 | 57.5 |
| | 4 | +0.115 | -20.3 | 56.9 |
| | 6 | +0.128 | -20.5 | 57.5 |

The Rheometer is operated at 30 rpm and the additive level is 0.5 percent by weight.

EXAMPLE 4

In this example we describe the reaction rate of another bifunctional caprolactim (O,O'-triethylene glycol bis-caprolactim) using the same procedure described in Example 2. We show that this bifunctional caprolactim is also capable of producing an increase in molecular weight of polymer while decreasing carboxyl content. What becomes apparent from comparison of this example to that described in Example 3 is that the reactivity of a bifunctional group is also greatly affected by the nature of the R group attaching the lactim moieties. Thus by variation of the nature of R group one may increase or decrease the reactivity of the lactims.

In this example O,O'-triethylene glycol biscaprolactim, which is a bifunctional caprolactim, is used as additive for modification of carboxyl content and IV of PET. Within a one minute reaction time the carboxyl content is reduced by 15 meq/kg and remains relatively constant during the entire experiment. Initially the additive does not cause a build up of molecular weight, indeed causing a slight reduction. But the molecular weight is increased gradually over the 6 minutes. The chain extendability and carboxyl reducing capability of this additive is not as good as that observed by O,O'-butylene bis-caprolactim ether in example 3. Therefore although both of these bifunctional caprolactims have the same reacting moieties at the end of the molecules, but because of the nature of the R group i.e.

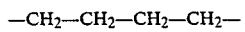
—CH₂—CH₂—CH₂—CH₂— vs

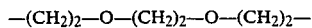
—(CH₂)₂—O—(CH₂)₂—O—(CH₂)₂— the reactivities of these two bifunctional caprolactime differ.

This becomes evident comparing carboxyl scavenging of several caprolactime (see Table 5) under similar experimental conditions. It is apparent that the nature of the R group greatly affects reactivity of the caprolactims.

TABLE 4

Reaction of PET with O,O'—Triethylene Glcyol bis-Caprolactim at 290° C. in a Brabender Rheometer as a Function of Time

| Additive | Reaction Time, min | ΔIV g/dl | ΔCOOH meq/kg | % Carboxyl Scavenging Efficiency |
|---|---|---|---|---|
| O,O'—Triethylene-Glycol-bis-Caprolactim | 1 | −0.018 | −14.9 | 50.7 |
| | 2 | +0.005 | −14.4 | 49.0 |
| | 4 | +0.054 | −14.6 | 49.7 |
| | 6 | +0.074 | −12.9 | 43.9 |

Reaction temperature was 290° C., the rheumeter was operated at 30 rpm.

TABLE 5

A Comparison of Carboxyl Scavenging Efficiency of Several Caprolactims

| | % Carboxyl Scavenging Efficiency |
|---|---|
| O—Methyl Caprolactim | 5–6 |
| O—Ethyl Caprolactim | 25–30 |
| O,O'—Butylene bis-Caprolactim | 40–60 |
| O,O'—Triethylene Glycol bis-Caprolactim | 30–50 |

Reaction carried on in a Brabender Rheometer at 280° C., 0.5% by weight loading at 30 rpm.

EXAMPLE 5

In this experiment a bifunctional caprolactim (O,O'-butylene bis-caprolactim) was melted and injected into a PET melt in the amounts given in Table 6. The PET melt was passed through static mixers, then spun into yarn. In the table the IV and COOH (absolute values) of the yarn samples with additive are compared to a control yarn with no caprolactim additive. The physical properties of the yarns with additive were equal or better than those of the control.

TABLE 6

| Additive, % | IV g/dl | COOH meq/kg |
|---|---|---|
| 0 (Control) | 0.868 | 24.6 |
| 0.14 | 0.879 | 20.0 |
| 0.27 | 0.896 | 14.2 |

What is claimed:

1. A method of melt spinning high molecular weight polyester polymer to produce fibers with reduced carboxyl end group concentration comprising admixing and reacting with molten polyester polymer an effective amount of at least one lactim compound of the formula

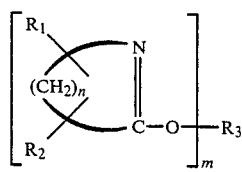

wherein
n is an integer of 2 to 15;
m is an integer of 1 to 4;
$R_1$ and $R_2$ are independently hydrogen, halogen, nitro, amine, $C_1$–$C_{10}$ alkyl, $C_5$–$C_{12}$ cycloalkyl, $C_7$–$C_9$ alkyl aromatic, or $C_6$–$C_{10}$ aromatic; and
$R_3$ is a mono- to tetravalent organic radical selected from the group consisting of $C_1$–$C_{32}$ alkyl, $C_5$–$C_{14}$ cycloalkyl, $C_7$–$C_{16}$ alkyl aromatic, and $C_6$–$C_{14}$ aromatic;
forcing the reacted molten polymer under pressure to a spinneret;
and extruding the lactim reacted polymer into a zone of lower pressure and temperature to form a fiber.

2. The method of claim 1 wherein $R_1$ and $R_2$ are each hydrogen.

3. The method of claim 2 wherein $R_3$ is selected from the group consisting of $C_1$–$C_{32}$ alkyl, $C_5$–$C_{14}$ cycloalkyl, and $C_7$–$C_{16}$ alkyl aromatic.

4. The method of claim 3 wherein 0.1 to 5.0 weight percent based on weight of the polymer of said lactim compound is admixed with said polymer.

5. The method of claim 3 wherein $R_3$ is $C_1$–$C_{32}$ alkyl.

6. The method of claim 5 wherein 0.1 to 5.0 weight percent based on weight of the polymer of said lactim compound is admixed with said polymer.

7. The method of claim 6 wherein 0.1 to 2.0 weight percent of said lactim compound is admixed with said polymer.

8. The method of claim 7 wherein 0.1 to 1.0 weight percent of said lactim compound is admixed with said polymer.

9. The method of claim 1 wherein said lactim is selected from the group consisting of
O-methyl caprolactim;
O-ethyl caprolactim;
O,O'-butylene bis-caprolactim;
O,O'-triethylene glycol bis-caprolactim; and
O,O'-diethylene glycol bis-caprolactim.

10. The method of claim 1 wherein at least a portion of said lactim compound comprises a lactim compound of said formula wherein m is an integer of 2 to 4 and $R_3$ is a bis- to tetravalent radical in an amount sufficient to produce fibers with increased intrinsic viscosity.

11. The method of claim 10 wherein $R_1$ and $R_2$ are each hydrogen.

12. The method of claim 11 wherein $R_3$ is selected from the group consisting of $C_1$–$C_{32}$ alkyl, $C_5$–$C_{14}$ cycloalkyl, and $C_7$–$C_{16}$ alkyl aromatic.

13. The method of claim 12 wherein 0.1 to 5.0 weight percent based on weight of the polymer of said lactim compound is admixed with said polymer.

14. The method of claim 13 wherein 0.1 to 2.0 weight percent of said lactim compound is admixed with said polymer.

15. The method of claim 14 wherein 0.1 to 1.0 weight percent of said lactim compound is admixed with said polymer.

16. The method of claim 12 wherein $R_3$ is $C_1$—$C_{32}$ alkyl.

17. The method of claim 16 wherein 0.1 to 5.0 weight percent based on weight of the polymer of said lactim compound is admixed with said polymer.

18. The method of claim 17 wherein 0.1 to 2.0 weight percent of said lactim compound is admixed with said polymer.

19. The method of claim 18 wherein 0.1 to 1.0 weight percent of said lactim compound is admixed with said polymer.